(12) United States Patent
Suzuki et al.

(10) Patent No.: US 11,483,826 B2
(45) Date of Patent: Oct. 25, 2022

(54) TERMINAL APPARATUS, BASE STATION APPARATUS, AND COMMUNICATION METHOD

(71) Applicants: SHARP KABUSHIKI KAISHA, Sakai (JP); FG Innovation Company Limited, Tuen Mun (HK)

(72) Inventors: Shoichi Suzuki, Sakai (JP); Tomoki Yoshimura, Sakai (JP); Taewoo Lee, Sakai (JP); Wataru Ouchi, Sakai (JP); Liqing Liu, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 81 days.

(21) Appl. No.: 16/753,738

(22) PCT Filed: Oct. 11, 2018

(86) PCT No.: PCT/JP2018/037895
§ 371 (c)(1),
(2) Date: Apr. 3, 2020

(87) PCT Pub. No.: WO2019/074043
PCT Pub. Date: Apr. 18, 2019

(65) Prior Publication Data
US 2020/0260449 A1    Aug. 13, 2020

(30) Foreign Application Priority Data
Oct. 12, 2017  (JP) .............................. JP2017-198335

(51) Int. Cl.
*H04W 72/04*   (2009.01)
*H04L 5/00*    (2006.01)

(52) U.S. Cl.
CPC ....... *H04W 72/0453* (2013.01); *H04L 5/0007* (2013.01)

(58) Field of Classification Search
CPC .............. H04W 72/0453; H04W 72/04; H04L 5/0007; H04L 1/0072; H04L 25/03866;
(Continued)

(56) References Cited

U.S. PATENT DOCUMENTS

2018/0279210 A1*  9/2018  Sun ...................... H04L 5/0053
2019/0007124 A1*  1/2019  Seo ...................... H04L 5/0044
(Continued)

OTHER PUBLICATIONS

3GPP TSG-RAN WG1 R1-1715750 (Year: 2017).*
(Continued)

*Primary Examiner* — Un C Cho
*Assistant Examiner* — Yu-Wen Chang
(74) *Attorney, Agent, or Firm* — ScienBiziP, P.C.

(57) ABSTRACT

A terminal apparatus includes: a monitor unit configured to monitor a first PDCCH candidate with aggregation level 8 and a second PDCCH candidate with aggregation level 16 in a CORESET mapped to one OFDM symbol; and a receiver configured to receive a PDSCH, by assuming that a symbol of the PDSCH is mapped to a resource element that is not overlapping the second PDCCH candidate, based on a PDCCH detected in the first PDCCH candidate, the PDCCH scheduling the PDSCH, wherein a CCE that constitutes the first PDCCH candidate and has a lowest index is identical to a CCE that constitutes the second PDCCH candidate and has a lowest index, and a plurality of the CCEs constituting the CORESET each include six contiguous REGs in a frequency domain.

2 Claims, 13 Drawing Sheets

(58) Field of Classification Search
CPC . H04L 27/2602; H04L 5/0051; H04L 5/0098; H04L 5/001; H04L 5/0048; H04L 5/0053; H04L 5/0044; H04J 13/16
See application file for complete search history.

(56) References Cited

U.S. PATENT DOCUMENTS

| | | | | |
|---|---|---|---|---|
| 2019/0044649 | A1* | 2/2019 | Kim | H04L 1/00 |
| 2019/0200345 | A1* | 6/2019 | Zhang | H04W 72/0413 |
| 2020/0008231 | A1* | 1/2020 | Vilaipornsawai | H04B 7/088 |
| 2020/0119865 | A1* | 4/2020 | Jiao | H04W 72/12 |
| 2020/0145165 | A1* | 5/2020 | Yang | H04L 5/0094 |
| 2020/0204311 | A1* | 6/2020 | Yoon | H04B 7/024 |

OTHER PUBLICATIONS

U.S. Appl. No. 62/476,207,Specification (Year: 2017).*
U.S. Appl. No. 62/476,207,Drawings (Year: 2017).*
3rd Generation Partnership Project; Technical Specification Group Radio Access Network; NR; Physical channels and modulation (Release 15); 3GPP TS 38.211 V1.0.0 (Sep. 2017).
3rd Generation Partnership Project; Technical Specification Group Radio Access Network; NR; Multiplexing and channel coding (Release 15); 3GPP TS 38.212 V1.0.0 (Sep. 2017).
3rd Generation Partnership Project; Technical Specification Group Radio Access Network; NR; Physical layer procedures for control (Release 15); 3GPP TS 38 213 V1.0.1 (Sep. 2017).
3rd Generation Partnership Project; Technical Specification Group Radio Access Network; NR; Physical layer procedures for data (Release 15); 3GPP TS 38.214 V1.0.1 (Sep. 2017).
Nokia et al., "Resource sharing between PDCCH and PDSCH in NR", R1-1715750, 3GPP TSG-RAN WG1 NRAH#3 Nagoya, Japan, Sep. 18-21, 2017.
Intel Corporation, "Resource sharing between PDCCH and PDSCH", 3GPP TSG RAN WG1 Meeting NR#3, Nagoya, Japan, Sep. 18-21, 2017.

* cited by examiner

If $E < (9/8) \cdot 2^{[\text{ceil}(\log_2 E)-1]}$ and $B/E < 9/16$ $m_1 = \text{ceil}(\log_2 E) - 1$;

else $m_1 = \text{ceil}(\log_2 E)$;

end if $R_{min} = 1/8$;

$m_2 = \text{ceil}[\log_2(B/R_{min})]$;

$m = \min\{m_1, m_2, m_{max}\}$ $C = 2^m$

FIG. 11

```
L1    k = 0; y_0=0; y_1=0; y_2=0; y_3=0; y_4=0;
L2    if AL ∈ {12, 16}
L3        x = 1;
L4    else (e.g. AL ∈ {1,2,3,4,6,8})
L5        x = 0;
L6    end if
L7    for n=0 to C-1
L8        y_t=y_0; y_0=y_1; y_1=y_2; y_2=y_3; y_3=y_4; y_4=y_t;
L9        if n ∈ Q'
L10           if n ∈ Q'_PC
L11               u_n = y_0 ⊕ x;    —parity bit
L12           else
L13               u_n = b_k;        —DCI or CRC parity bit
L14               k = k+1;
L15               y_0 = y_0 ⊕ u_n;
L16           end if
L17       else
L18           u_n = x;              —Frozen bit
L19       end if
L20   end for
```

FIG. 12

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2017-198335 filed on Oct. 12, 2017, the contents of which are incorporated herein by reference.

BACKGROUND ART

A radio access method and a radio network for cellular mobile communications (hereinafter referred to as "Long Term Evolution (LTE: Registered Trademark)", or "Evolved Universal Terrestrial Radio Access (EUTRA)") have been studied in the 3rd Generation Partnership Project (3GPP) (NPLs 1, 2, 3, 4, and 5). In 3GPP, a new radio access method (hereinafter referred to as "New Radio (NR)") has been studied. In LTE, a base station apparatus is also referred to as an evolved NodeB (eNodeB). In NR, a base station apparatus is also referred to as a gNodeB. In LTE, and in NR, a terminal apparatus is also referred to as a User Equipment (UE). LTE, as well as NR, is a cellular communication system in which multiple areas are deployed in a cellular structure, with each of the multiple areas being covered by a base station apparatus. A single base station apparatus may manage multiple cells.

PDCCHs and PDSCHs are used in the downlink of NR (NPL 1, 3, and 4).

CITATION LIST

Non Patent Literature

NPL 1: "3GPP TS 38.211 V1.0.0 (2017-09), NR; Physical channels and modulation", 7, Sep. 2017.

NPL 2: "3GPP TS 38,212 V1.0.0 (2017-09), NR; Multiplexing and channel coding", 7, Sep. 2017.

NPL 3: "3GPP TS 38.213 V1.0.1 (2017-09), NR; Physical layer procedures for control", 7, Sep. 2017.

NPL 4: "3GPP TS 38.214 V1.0.1 (2017-09), NR; Physical layer procedures for data", 7, Sep. 2017.

SUMMARY OF INVENTION

Technical Problem

One aspect of the present invention provides a terminal apparatus, a communication method used for the terminal apparatus, a base station apparatus, and a communication method used for the base station apparatus. The terminal apparatus, the communication method used for the terminal apparatus, the base station apparatus, and the communication method used for the base station apparatus according to the present invention include a method for efficiently determining a size of information, and/or a method for efficiently determining the number of modulation symbols/coded symbols/resource elements for information.

Solution to Problem (1) According to some aspects of the present invention, the following measures are provided. Specifically, a first aspect of the present invention is a terminal apparatus including: a receiver configured to receive a PDCCH including downlink control information; and a decoding unit configured to decode downlink control information, wherein a sequence of coded bits of the downlink control information is scrambled with a scrambling sequence, and the scrambling sequence is initialized based at least on an aggregation level of the PDCCH.

(2) A second aspect of the present invention is a base station apparatus including: a coding unit configured to encode downlink control information; and a transmitter configured to transmit a PDCCH including downlink control information, wherein a sequence of coded bits of the downlink control information is scrambled with a scrambling sequence, and the scrambling sequence is initialized based at least on an aggregation level of the PDCCH.

(3) A third aspect of the present invention is a communication method for a terminal apparatus, the communication method including the steps of: receiving a PDCCH including downlink control information; and decoding downlink control information, wherein a sequence of coded bits of the downlink control information is scrambled with a scrambling sequence, and the scrambling sequence is initialized based at least on an aggregation level of the PDCCH.

(4) A fourth aspect of the present invention is a communication method for a base station apparatus, the communication method including the steps of: encoding downlink control information; and transmitting a PDCCH including downlink control information, wherein a sequence of coded bits of the downlink control information is scrambled with a scrambling sequence, and the scrambling, sequence is initialized based at least on an aggregation level of the PDCCH.

Advantageous Effects of Invention

According to one aspect of the present invention, the terminal apparatus can efficiently perform reception of downlink transmission. The base station apparatus can efficiently perform downlink transmission.

BRIEF DESCRIPTION OF DRAWINGS

FIG. 11 is a diagram illustrating an example of a pseudo code for calculating C according to the present embodiment.

FIG. 12 is a diagram illustrating an example of a pseudo code for generating a matrix u' according to the present embodiment.

DESCRIPTION OF EMBODIMENTS

Embodiments of the present invention will be described below.

Figure 1:
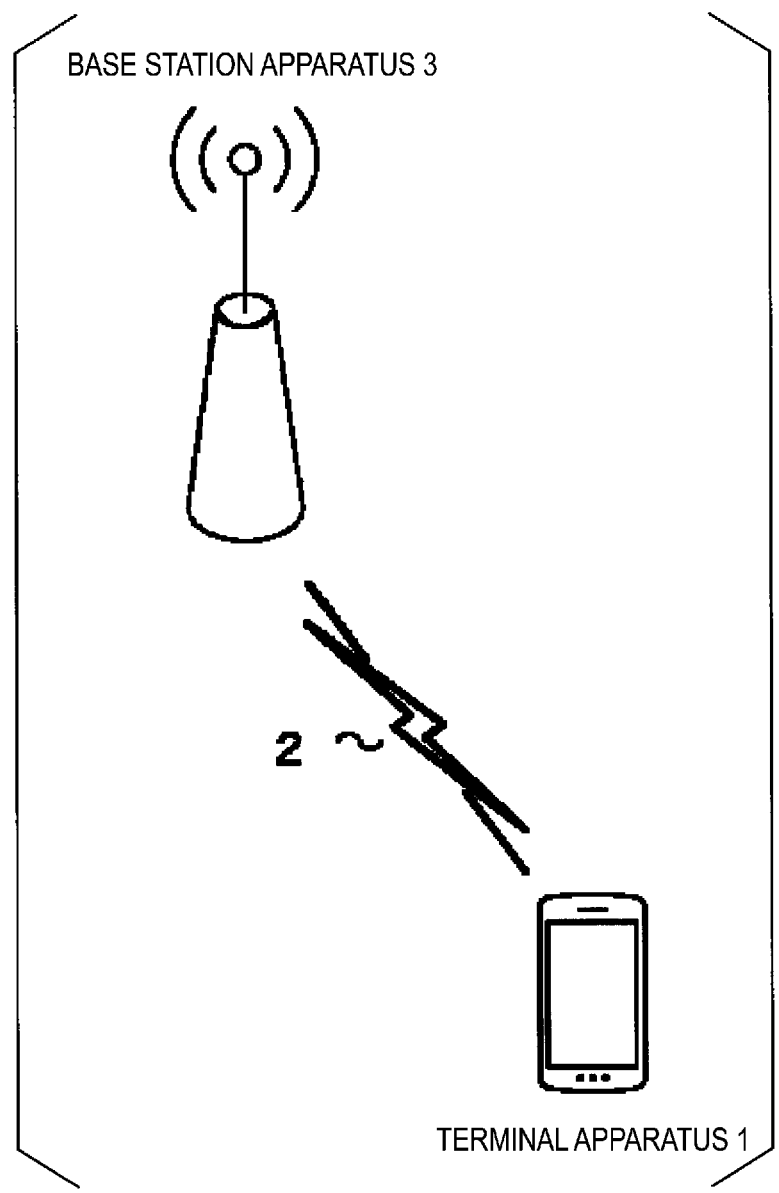
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 1 and a base station apparatus 3.

Hereinafter, carrier aggregation will be described.

According to the present embodiment, one or multiple serving cells are configured for the terminal apparatus 1. A technology in which the terminal apparatus 1 communicates via the multiple serving cells is referred to as cell aggregation or carrier aggregation. An aspect of the present invention may be applied to each of the multiple serving cells configured for the terminal apparatus 1. An aspect of the present invention may be applied to some of the multiple serving cells configured. The multiple serving cells includes at least one primary cell. Here, the multiple serving cells may include at least one of multiple secondary cells.

The primary cell is a serving cell in which an initial connection establishment procedure has been performed, a serving cell in which a connection re-establishment procedure has been initiated, or a cell indicated as a primary cell in a handover procedure. The secondary cell may be configured at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component carriers). A single physical channel is transmitted in a single serving cell (component carrier) out of the multiple serving cells (component carriers).

Physical channels and physical signals according to the present embodiment will be described.

In uplink radio communication from the terminal apparatus 1 to the base station apparatus 3, the following uplink physical channels are used. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used for transmitting Channel State Information (CSI) of the downlink, and/or, Hybrid Automatic Repeat reQuest (HARQ-ACK). The CSI, as well as the HARQ-ACK, is Uplink Control Information (UCI).

The PUSCH is used for transmitting uplink data (Transport block, Uplink-Shared Channel (UL-SCH)), the CSI of the downlink, and/or the HARQ-ACK. The CSI, as well as the HARQ-ACK, is Uplink Control Information (UCI). The terminal apparatus 1 may transmit the PUSCH, based on detection of a Physical Downlink Control Channel (PDCCH) including an uplink grant.

The PRACH is used to transmit a random access preamble.

The following uplink physical signal is used in the uplink radio communication. The uplink physical signal is not used for transmitting information output from the higher layer, but is used by the physical layer.

Demodulation Reference Signal (DMRS)

The DMRS is associated with transmission of the PUSCH or the PUCCH. The DMRS may be time-multiplexed with the PUSCH. The base station apparatus 3 may use the DMRS in order to perform channel compensation of the PUSCH.

The following downlink physical channels are used for downlink radio communication from the base station apparatus 3 to the terminal apparatus 1. The downlink physical channels are used for transmitting information output from the higher layer.

Physical Downlink Control Channel (PDCCH)
Physical Downlink Control Channel (PUSCH)

The PDCCH is used to transmit Downlink Control Information (DCI). The downlink control information is also referred to as DCI format. The downlink control information includes an uplink grant. The uplink grant may be used for scheduling of a single PUSCH within a single cell. The uplink grant may be used for scheduling multiple PUSCHs in multiple slots within a single cell. The uplink grant may be used for scheduling a single PUSCH in multiple slots within a single cell.

The PDSCH is used to transmit downlink data (Transport block, Downlink-Shared Channel (DL-SCH)).

The UL-SCH and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU).

A configuration of the radio frame according to the present embodiment will be described below.

Figure 2:
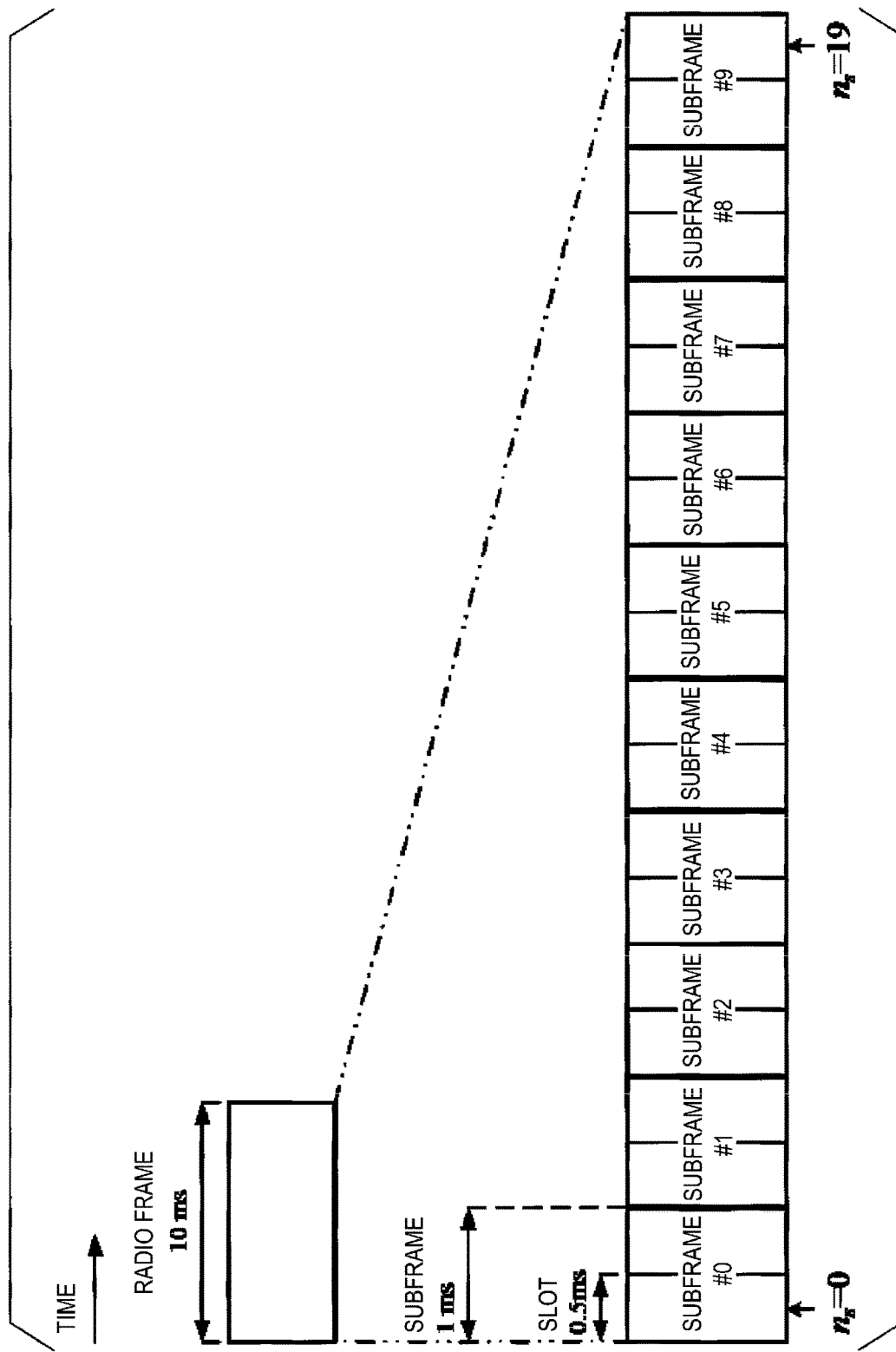
FIG. 2 is a diagram illustrating a schematic configuration of a radio frame according to the present embodiment.

FIG. 2 is a diagram illustrating a schematic configuration of the radio frame according to the present embodiment. In FIG. 2, the horizontal axis is a time axis. Each of the radio frames may be 10 ms in length. Each of the radio frames may include ten slots. Each of the slots may be 1 ms in length.

Figure 3:
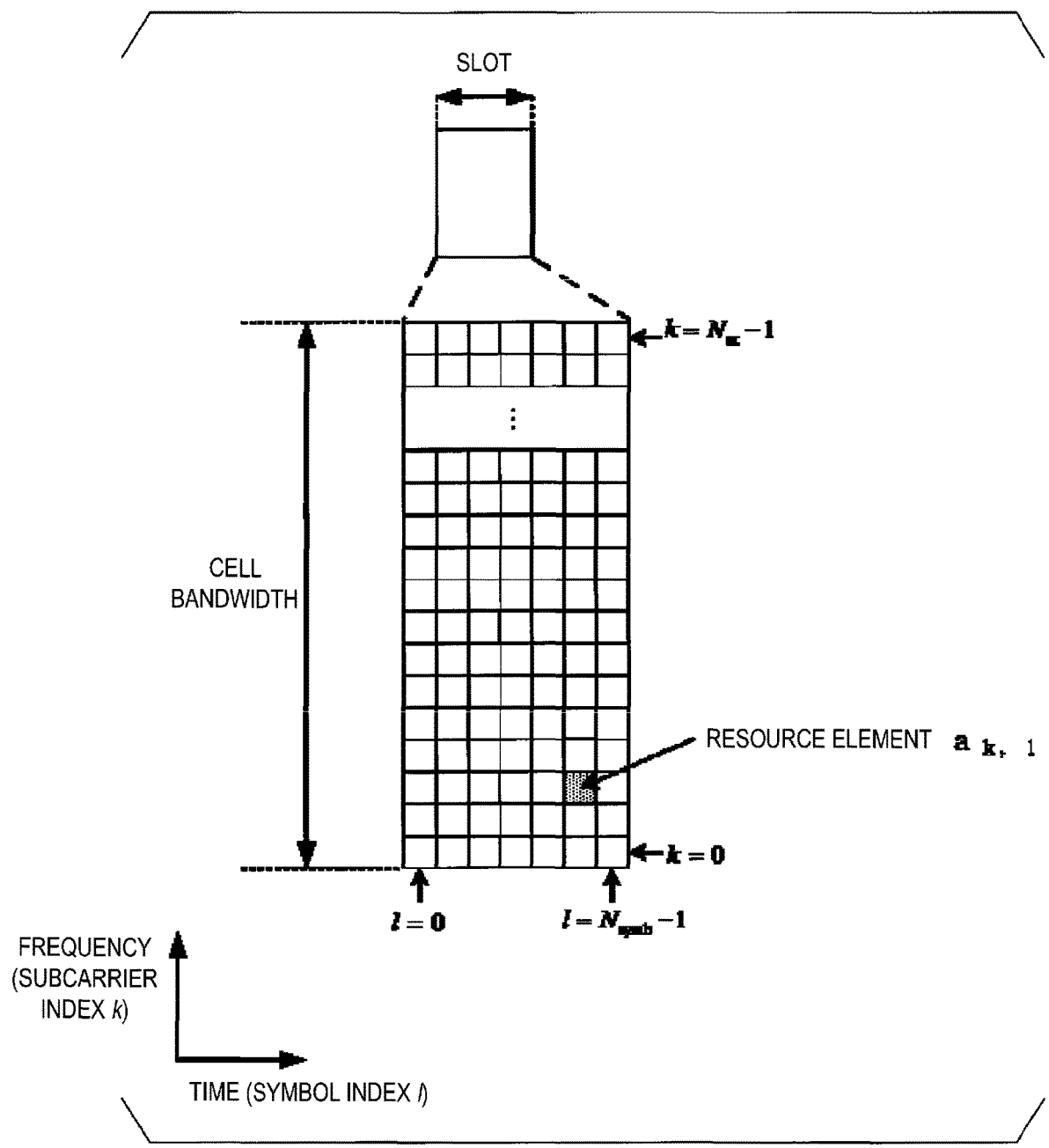
FIG. 3 is a diagram illustrating a schematic configuration of an uplink slot according to the present embodiment.

An example configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, the horizontal axis is a time axis, and the vertical axis is a frequency axis. The uplink slot may include $N^{UL}_{symb}$-FDMA symbols. The uplink slot may include $N^{UL}_{symb}$ OFDM symbols. Hereinafter, in the present embodiment, a case that the uplink slot includes OFDM symbols will be described, but the present embodiment can be applied in a case that the uplink slot includes SC-FDMA symbols.

In FIG. 3, 1 is an OFDM symbol number/index, and k is a subcarrier number/index. The physical signal or the physical channel transmitted in each of the slots is expressed by a resource grid. In the uplink, the resource grid is defined by multiple subcarriers and multiple OFDM symbols. Each element within the resource grid is referred to as a resource element. The resource element is expressed by a subcarrier number/index k and an OFDM symbol number/index 1.

The uplink slot includes the multiple OFDM symbols 1 (1=0, 1, ..., $N^{UL}_{symb}$) in the time domain. For a normal Cyclic Prefix (CP) in the uplink, $N^{UL}_{symb}$ may be 7 or 14, For an extended CP in the uplink, $N^{UL}_{symb}$ may be 6 or 12.

The terminal apparatus 1 receives the parameter UL-CyclicPrefixLength of the higher layer indicating the CP length in the uplink from the base station apparatus 3. The base station apparatus 3 may broadcast, in the cell, system information including the parameter UL-CyclicPrefixLength of the higher layer corresponding to the cell.

The uplink slot includes the multiple subcarriers k=0, 1, ..., $N^{UL}_{RB} * N^{RB}_{SC}$) in the frequency domain. $N^{UL}_{RB}$ is an uplink bandwidth configuration for the serving cell expressed by a multiple of $N^{RB}_{SC}$. $N^{RB}_{SC}$ is the (physical) resource block size in the frequency domain expressed by the number of subcarriers. The subcarrier spacing Δf may be 15 kHz. $N^{RB}_{SC}$ may be 12. The (physical) resource block size in the frequency domain may be 180 kHz.

One physical resource block is defined by $N^{UL}_{symb}$ consecutive OFDM symbols in the time domain and by $N^{RB}_{SC}$ consecutive subcarriers in the frequency domain. Hence, one physical resource block is constituted by ($N^{UL}_{symb} * N^{RB}_{SC}$) resource elements. One physical resource block may correspond to one slot in the time domain. The physical resource blocks may be numbered $n_{PRB}$ (0, 1, ..., $N^{UL}_{RB}-1$) in ascending order of frequencies in the frequency domain.

The downlink slot according to the present embodiment includes multiple OFDM symbols. Since the configuration of the downlink slot according to the present embodiment is basically the same as the configuration of the uplink slot, the description of the configuration of the downlink slot will be omitted.

Configurations of apparatuses according to the present embodiment will be described below.

Figure 4:
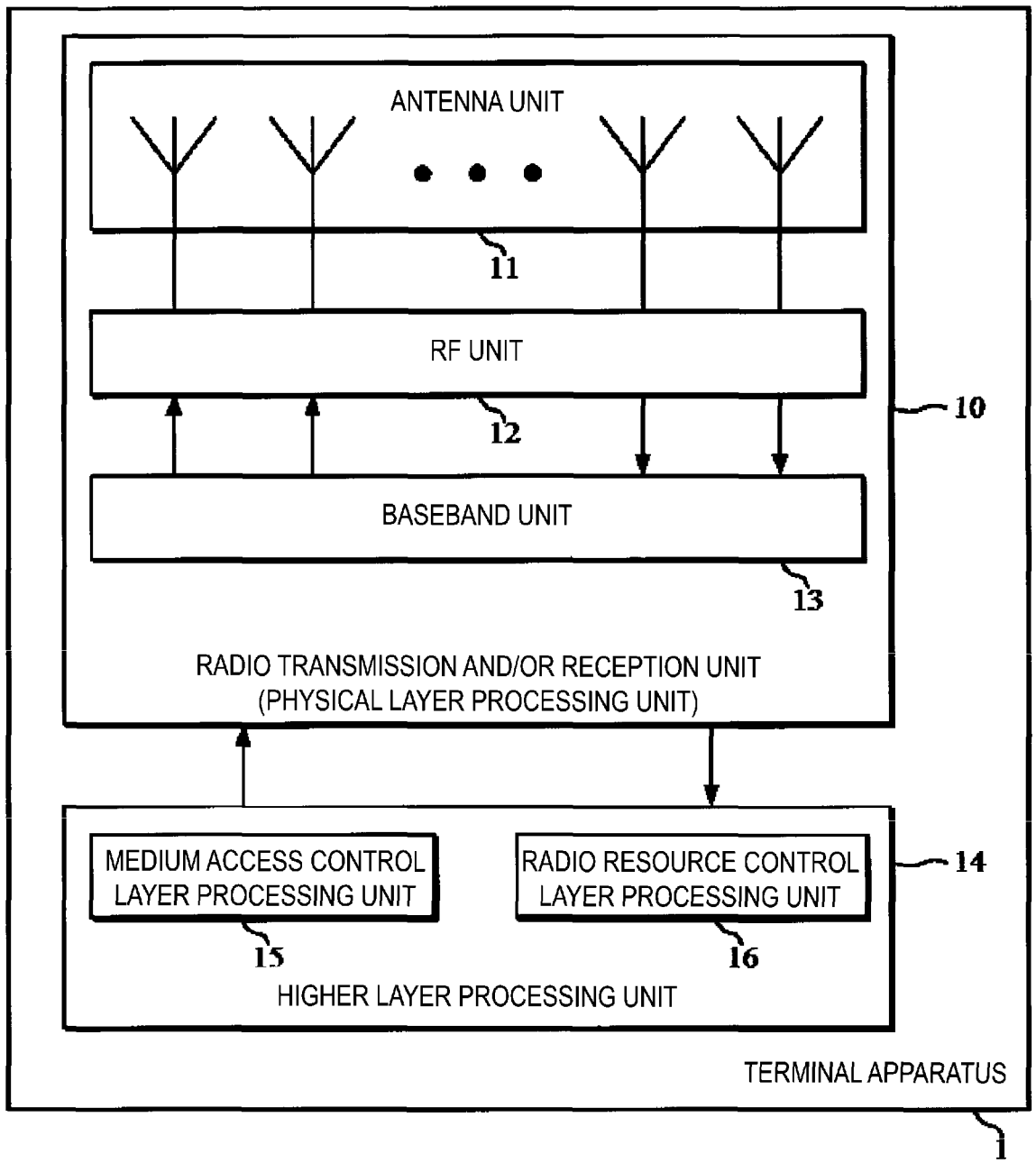
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver, a coding unit, a decoding unit, or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls random access procedure in accordance with the various configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages various types of configuration information/parameters of the terminal apparatus 1. The radio resource control layer processing unit 16 sets various types of configuration information/parameters based on a higher layer signal received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the analog signal resulting from the conversion, to the RF unit 12.

The RE unit 12 removes unnecessary frequency components from the analog signal input from the baseband unit 13 using a low-pass filter, up-converts the analog signal into a signal of a carrier frequency, and transmits the up-converted signal via the antenna unit 11. The RF unit 12 amplifies power. The RE unit 12 may have a function of controlling transmit power. The RE unit 12 is also referred to as a transmit power control unit.

Figure 5:
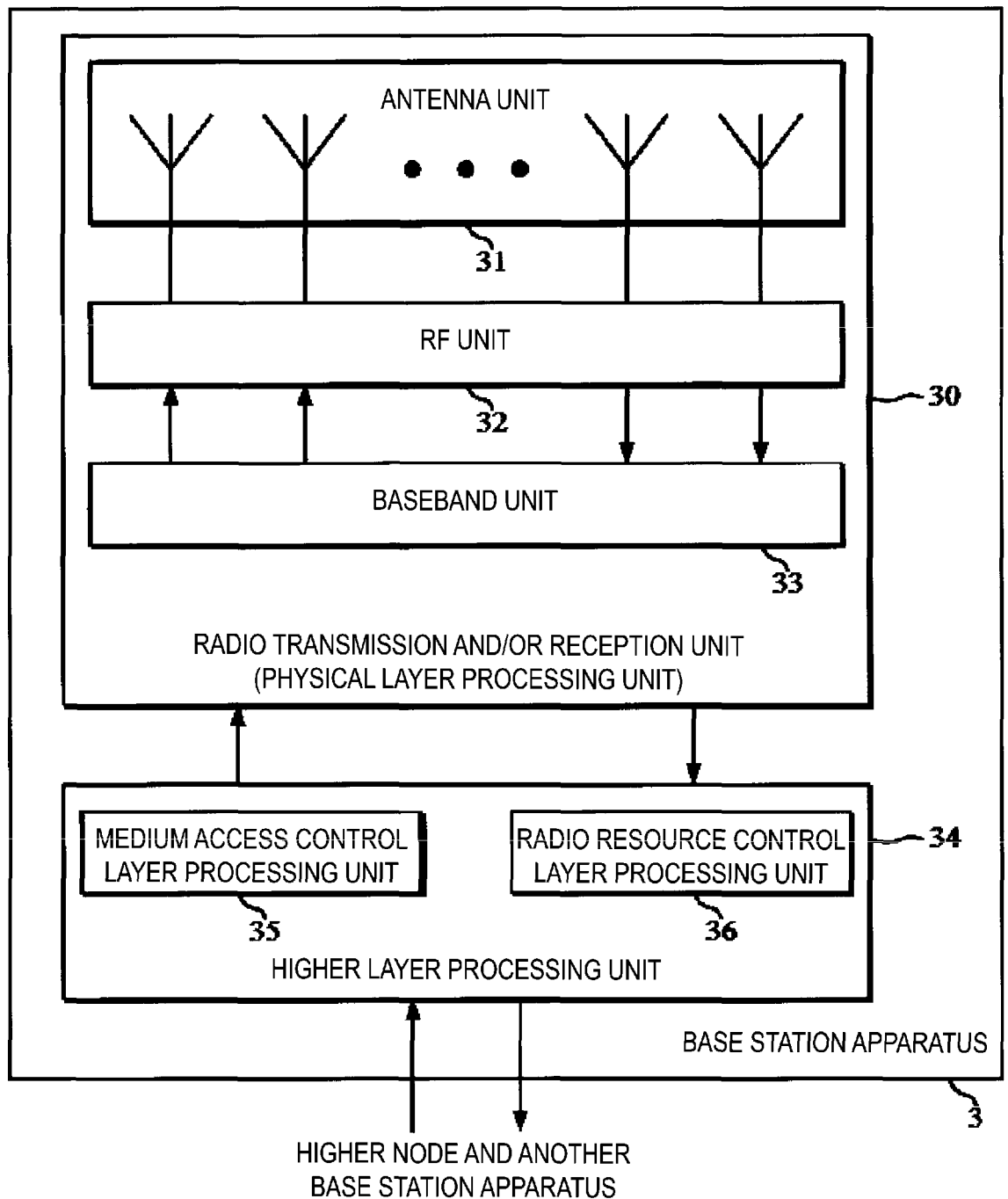
FIG. 5 is a schematic block diagram illustrating a configuration of a base station apparatus 3 according to the present embodiment.

FIG. 5 is a schematic block diagram illustrating a configuration of the base station apparatus 3 according to the present embodiment. As illustrated, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, a coding unit, a decoding unit, or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 controls random access procedure in accordance with the various configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. The radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information for indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit. Each of the units having the reference signs 10 to 16 included in the terminal apparatus 1 may be configured as at least one processor and a memory coupled to the at least one processor. Each of the units having the reference signs 30 to 36 included in the base station apparatus 3 may be configured as at least one processor and a memory coupled to the at least one processor.

A control resource set (CORESET) will be described as follows.

Figure 6:
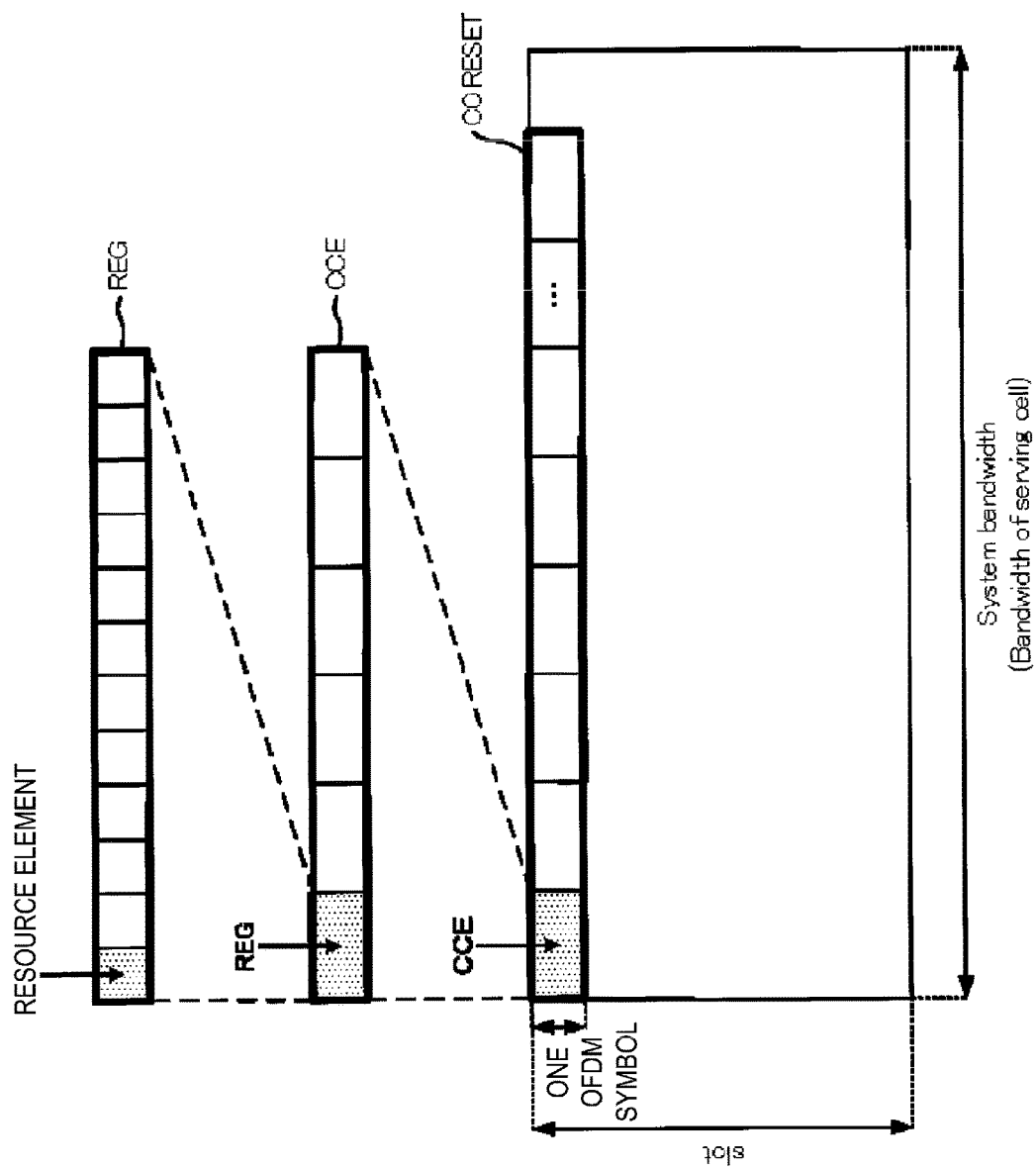
FIG. 6 is a diagram illustrating an example of a CORESET according to the present embodiment.

FIG. 6 is a diagram illustrating an example of a CORESET according to the present embodiment. In the time domain, CORESET may be included in the first OFDM symbol of the slot. The CORESET may be constituted by multiple resource elements contiguous in the frequency domain. The CORESET may be constituted by multiple CCEs. One CCE may be constituted by six contiguous REGs in the frequency domain. One REG may be constituted by 12 contiguous resource elements in the frequency domain.

Figure 7:
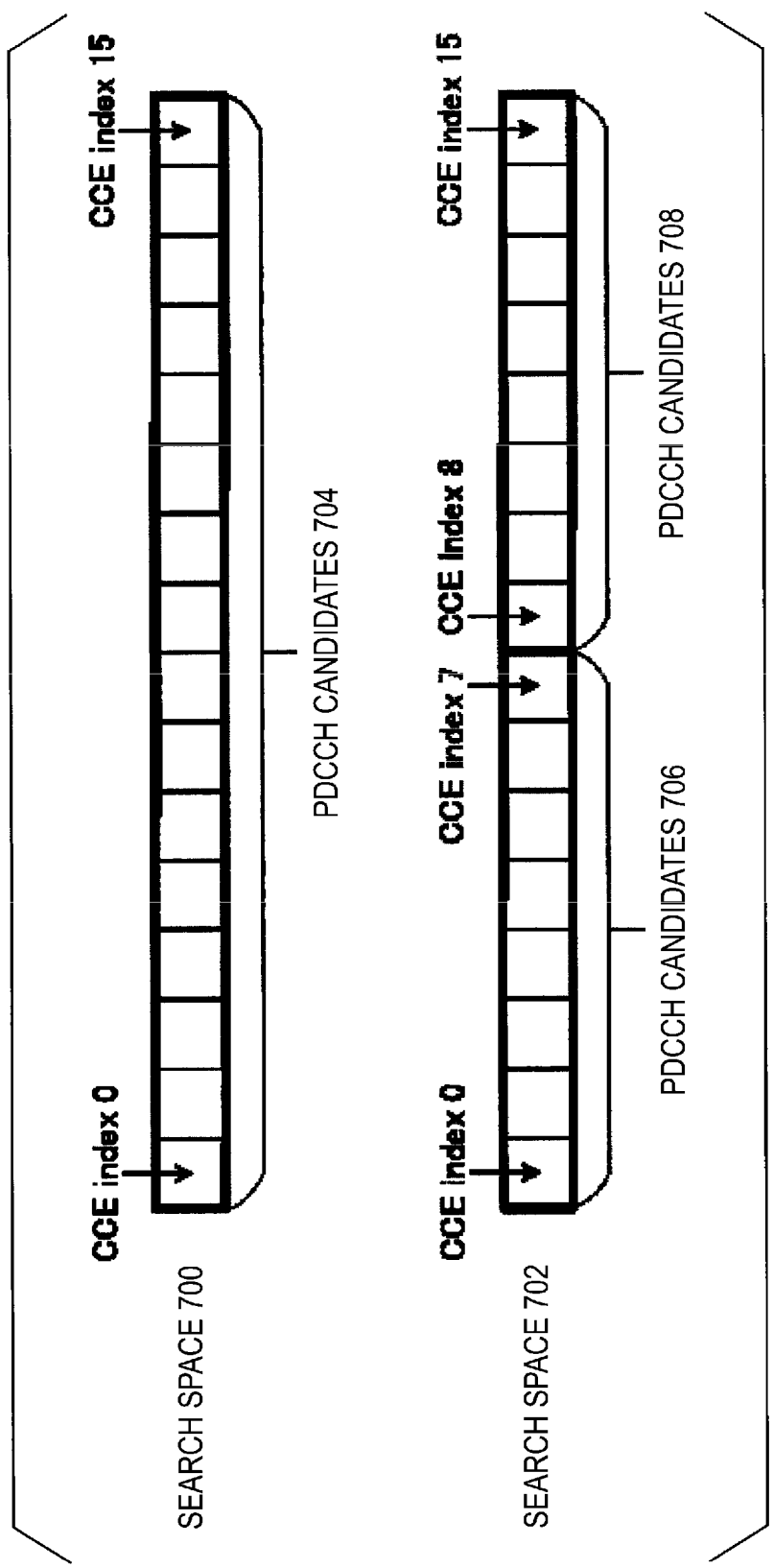
FIG. 7 is a diagram illustrating an example of a search space according to the present embodiment.

FIG. 7 is a diagram illustrating an example of a search space according to the present embodiment. The search space is a set of PDCCH candidates. The PDCCH is transmitted in the PDCCH candidate. The terminal apparatus 1 attempts to decode the PDCCH in the search space. The PDCCH candidate may be constituted by at least one or multiple consecutive CCEs. The number of CCEs constituting the PDCCH candidate is also referred to as an aggregation level. The search space may be defined for each aggregation level. The search space 700 includes PDCCH candidates 704 having an aggregation level of 16. The search space 702 includes PDCCH candidates 706 and 708 having an aggregation level of 8. The CCE with the smallest index constituting the PDCCH candidate 704 is the same as the CCE with the smallest index constituting the PDCCH candidate 706.

Figure 8:
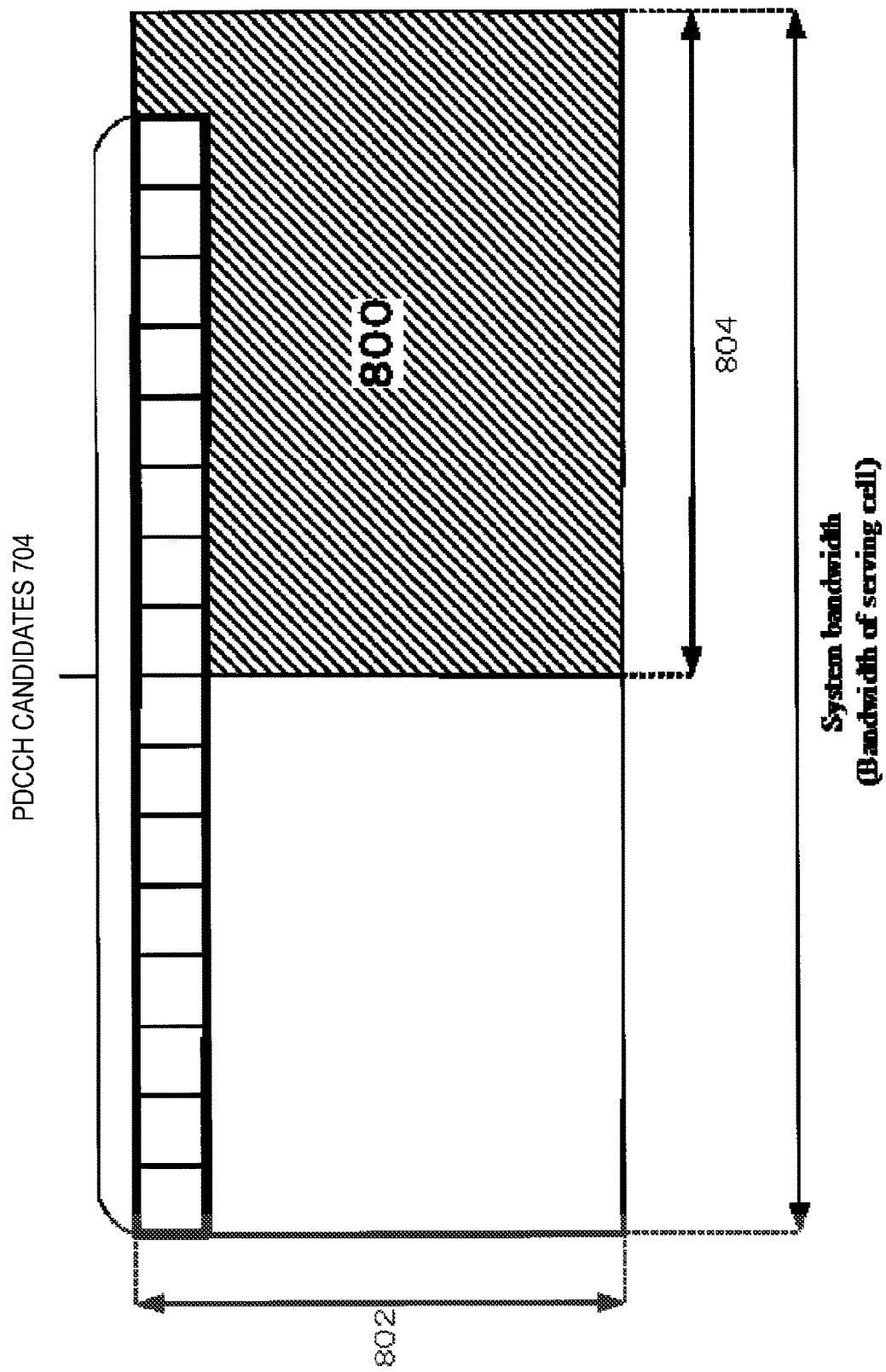
FIG. 8 is a diagram illustrating an example of a PDCCH resource and a PDSCH resource according to the present embodiment.

FIG. 8 is a diagram illustrating an example of a PDCCH resource and a PDSCH resource according to the present embodiment. The PDCCH transmitted in the PDCCH candidate 704 includes a downlink assignment used for scheduling of the PDSCH 800. 802 is the OFDM symbols allocated for the PDSCH. 804 is the band assigned for the PDSCH. The base station apparatus 3 maps PDSCH 800 symbols to resource elements, avoiding the PDCCH resource 704 for scheduling the PDSCH 800.

Figure 9:
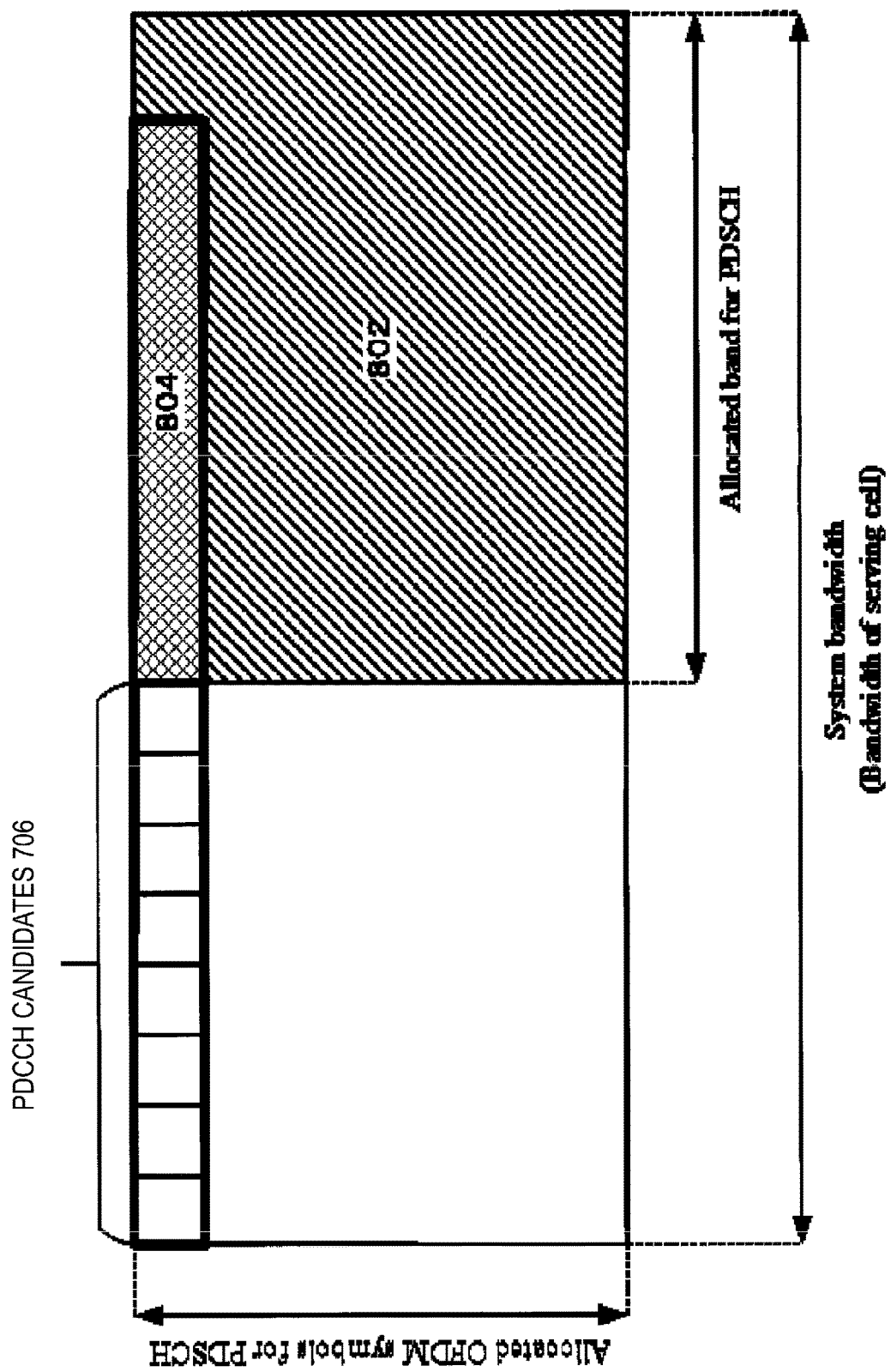
FIG. 9 is a diagram illustrating an example of a mismatch of a PDSCH resource between the terminal apparatus 1 and the base station apparatus 3 according to the present embodiment.

FIG. 9 is a diagram illustrating an example of a mismatch of a PDSCH resource between the terminal apparatus 1 and the base station apparatus 3 according to the present embodiment. In a case that the base station apparatus 3 transmits the PDCCH in the PDCCH candidate 704, the terminal apparatus 1 may successfully decode the PDCCH in the PDCCH candidate 706. In this case, the base station apparatus 3 does not transmit the PDSCH in 804, but the terminal apparatus 1 may determine that the PDSCH is transmitted in 804. 804 is resource elements allocated for the PDSCH, but is resource elements used for transmission of the PDCCH for scheduling the PDSCH. In a case that the terminal apparatus 1 detects the PDCCH in the PDCCH candidate 706, the terminal apparatus 1 may consider that the symbols of the PDSCH 800 are mapped to resource elements by avoiding the PDCCH candidate 704, and may receive the PDSCH 800.

Thus, the base station apparatus 3 may schedule the PDSCH by avoiding the CORESET, based on the terminal apparatus 1 simultaneously monitoring the PDCCH candidate 704 and the PDCCH candidate 706. The monitoring denotes an attempt to decode the PDCCH in accordance with a DCI format.

The base station apparatus 3 may transmit, on the PDCCH, information indicating that the CORESET is avoided in mapping of the PDSCH to resource elements, based on the terminal apparatus 1 simultaneously monitoring the PDCCH candidate 704 and the PDCCH candidate 706.

The terminal apparatus 1 may change the CCE constituting the PDCCH candidate 706 so that the CCE with the smallest index constituting the PDCCH candidate 706 differs from the CCE with the smallest index constituting the PDCCH candidate 704, based on the terminal apparatus 1 simultaneously monitoring the PDCCH candidate 704 and the PDCCH candidate 706.

In a case that the terminal apparatus 1 is configured to simultaneously monitor the PDCCH candidate 704 and the PDCCH candidate 706, the terminal apparatus 1 may not monitor either the PDCCH candidate 704 or the PDCCH candidate 706. In other words, in the case that the terminal apparatus 1 is configured to simultaneously monitor the PDCCH candidate 704 and the PDCCH candidate 706, the PDCCH candidate 704 may not be monitored. In other words, in the case that the terminal apparatus 1 is configured to simultaneously monitor the PDCCH candidate 704 and the PDCCH candidate 706, the PDCCH candidate 706 may not be monitored. In other words, (i) the CORESET is mapped to one OFDM symbol, (ii) the bandwidth of the CORESET is 96 physical resource blocks, (iii) the CCE included in the CORESET is constituted by continuous resource elements in the frequency domain, and (iv) in a case that the terminal apparatus 1 is configured to simultaneously monitor the PDCCH candidate 704 and the PDCCH candidate 706, the terminal apparatus 1 may not monitor either the PDCCH candidate 704 or the PDCCH candidate 706. Here, the terminal apparatus 1 may select the PDCCH candidate not to be monitored, based at least on the index of the slot and/or the index of the PDCCH candidate.

The generation of the downlink control information, the channel coding of the downlink control information, and/or the mapping of the PDCCH to the resource elements may be based at least on the aggregation level.

Figure 10:
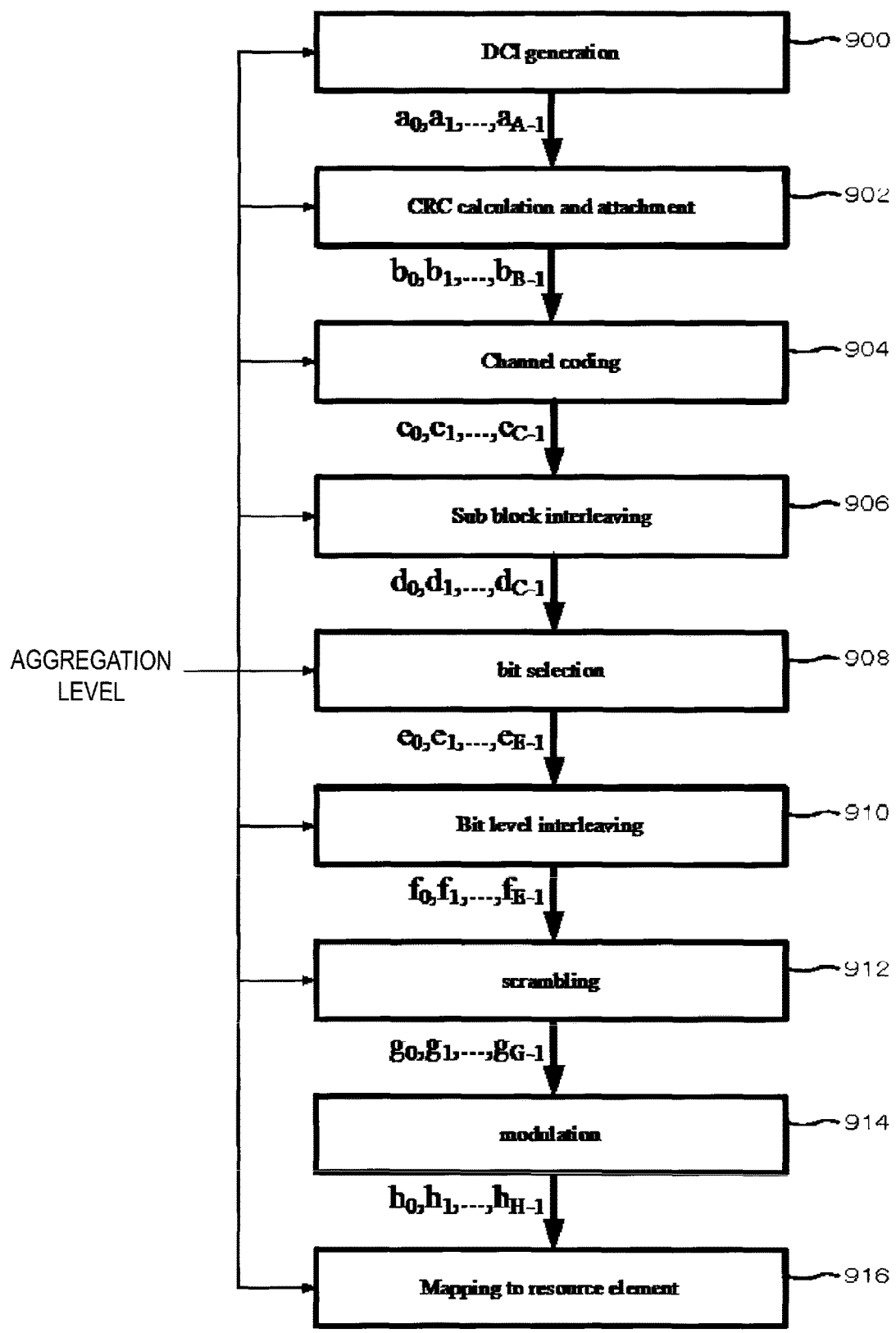
FIG. 10 is a diagram illustrating an example of a process related to downlink control information according to the present embodiment.

FIG. 10 is a diagram illustrating an example of a process related to the downlink control information according to the present embodiment. The base station apparatus 3 may perform some or all of the processing from 900 to 916, based on the aggregation level of the PDCCH used for transmission of the downlink control information $a_i$.

In 900, the base station apparatus 3 generates the downlink control information A is the number of bits of the downlink control information. The downlink control information $a_i$ may include information x indicating e aggregation level of the PDCCH used for the transmission of the downlink control information $a_i$. In a case that the aggregation level is a prescribed aggregation level, the information x indicating the aggregation level may be set to 1. In a case that the aggregation level is not a prescribed aggregation level, the information x indicating the aggregation level may be set to 0. The prescribed aggregation level may include at least 12 and 16. Aggregation levels other than the prescribed aggregation level may include at least 1, 2, 3, 4, 6, and 8.

In 902, the base station apparatus 3 generates CRC parity bits from the downlink control information and generates the bit sequence $b_i$ by adding the CRC parity bits to the downlink control information $a_i$. B is the sum of the number of the CRC parity bits and A. The base station apparatus 3 may select a sequence, based on the aggregation level of the PDCCH used for the transmission of the downlink control information and scramble the CRC parity bits by using the selected sequence. In a case that the aggregation level is a prescribed aggregation level, then a first sequence may be selected. In a case that the aggregation level is not a prescribed aggregation level, then a second sequence may be selected. Note that processing in 902 may be skipped.

In 904, the base station apparatus 3 generates the coded bits $c_i$ by channel coding the bit sequence $b_i$. The channel code may be a polar sign or a convolutional code. C is the number of channel coded bits. The base station apparatus 3 may be given with the coded bits $c_i$ by a product of a matrix u' and a matrix G'.

The matrix G' is a matrix of C rows and C columns, and may be given by n-th Kronecker power of two rows and two columns of a matrix $G_0$.

The matrix u'=$[u_0, u_1, \ldots, u_{C-1}]$ is a matrix of 1 row C columns and is generated based on the bit sequence $b_i$. The matrix u' may be generated further based on the information x indicating the aggregation level.

FIG. 11 is a diagram illustrating an example of a pseudo code for calculating C according to the present embodiment. E is the number of bits in the sequence $e_i$. E may be given based on the aggregation level. E may be given by the product of the aggregation level and 108. ceil (*) is a function that returns the smallest integer greater than the input value. ceil (*) is a function that returns the smallest value of the input values. That is, C may be given based on the aggregation level.

FIG. 12 is a diagram illustrating an example of a pseudo code for generating the matrix u' according to the present embodiment. In L2 to L6, the information x indicating the aggregation level is set to 1 or 0, based on the aggregation level of the PDCCH used for the transmission of the downlink control information $a_i$. The information x indicating the aggregation level is a variable x, set based on the aggregation level.

At L11, parity bits generated based on the information x indicating the aggregation level are set to elements $u_n$ in the matrix u'. $Q'_{PC}$ is a set of indices n of elements $u_n$ in which the parity bits are set.

In L13, elements $b_k$ in the sequence $b_i$ are set to elements $u_n$ in the matrix u'. Q' is parity bits or a set of indices n of elements $u_n$ in which the elements $b_k$ in the sequence $b_i$ are set. $Q'_{PC}$ is a subset of Q'.

At L18, the variable x set based on the aggregation level is set in the elements $u_n$ in the matrix u'. The elements $u_n$ in which the variable x set based on the aggregation level is set is the elements $u_n$ corresponding to indices n other than Q'. The elements $u_n$ in which the variable x set based on the aggregation level is set is also referred to as frozen bits.

In 906, the base station apparatus 3 may generate the sequence $d_i$ by interleaving the sequence based on the aggregation level of the PDCCH used for the transmission of the downlink control information $a_i$. In other words, the base station apparatus 3 may select the pattern of interleaving to be applied to the sequence cl, based on the aggregation level of the PDCCH used for the transmission of the downlink control information $a_i$.

Figure 13:
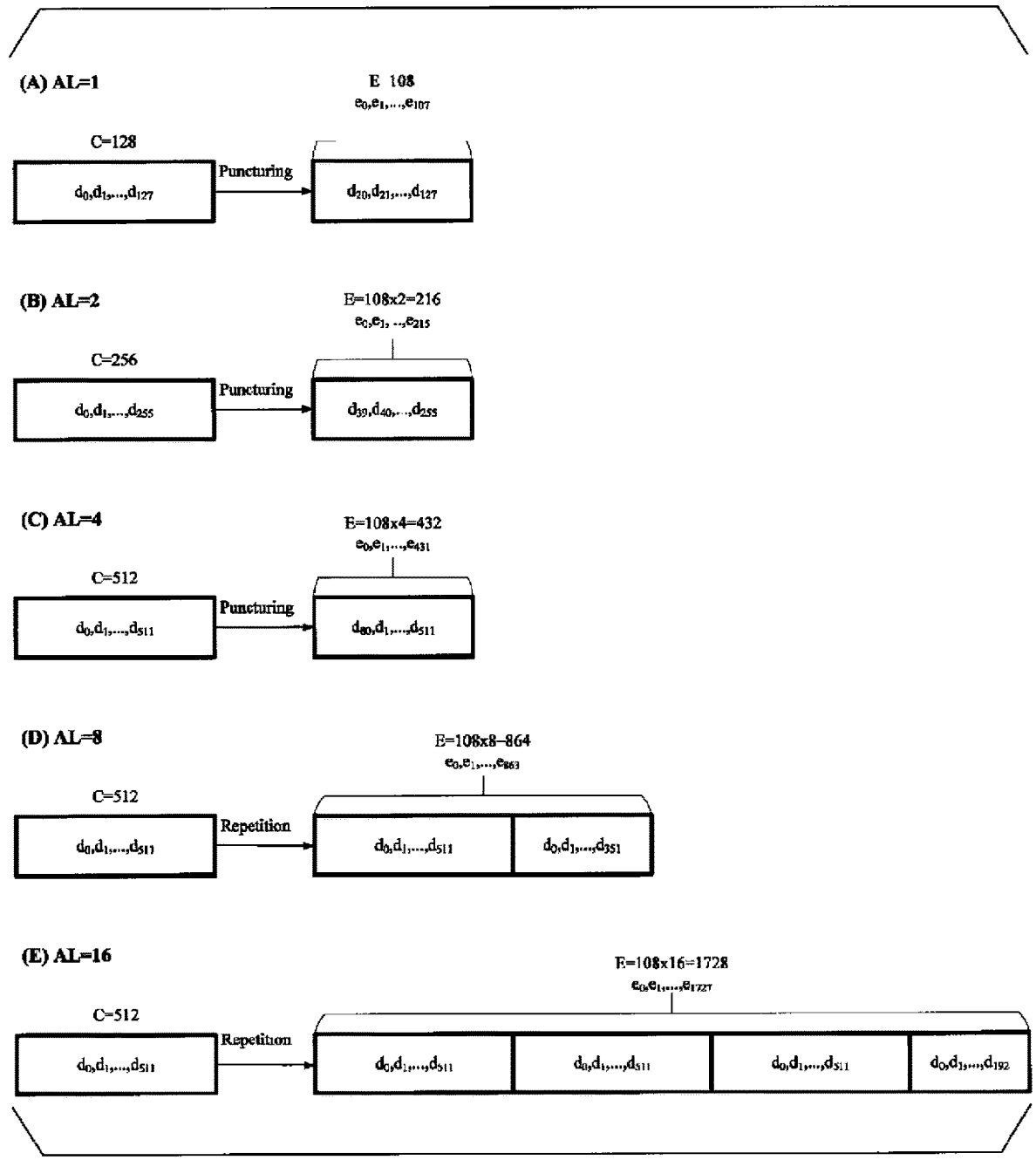
FIG. 13 is a diagram illustrating an example of a bit selection of a sequence $d_i$ according to the present embodiment.

In 908, the base station apparatus 3 may generate the sequence $e_i$ by repeating or punching the sequence $d_i$. FIG. 13 is a diagram illustrating an example of a bit selection of the sequence $d_i$ according to the present embodiment. In (A), (B), and (C) of FIG. 13, the sequence $e_i$ is generated by punching the sequence $d_i$. In (D) and (E) of FIG. 13, the sequence $e_i$ is generated by repeating the sequence $d_i$.

In 910, the base station apparatus 3 may generate the sequence $f_i$ by interleaving the sequence $e_i$, based on the aggregation level of the PDCCH used for the transmission of the downlink control information $a_i$. In other words, the base station apparatus 3 may select the pattern of interleave to be applied to the sequence $e_i$, based on the aggregation level of the PDCCH used for the transmission of the downlink control information $a_i$.

In 910, the base station apparatus 3 may generate the sequence $g_i$ by scrambling the sequence $f_i$ by using a scrambling sequence. The scrambling sequence may be initialized based at least on the variable x set based on the aggregation level. The scrambling sequence may further be initialized based at least on a physical layer cell identifier (physical layer cell identity). The terminal apparatus 1 may acquire a physical layer cell identity from a synchronization signal by cell search. The terminal apparatus 1 may acquire a physical layer cell identity from information received from the base station apparatus 3.

In 914, the base station apparatus 3 generates the sequence $h_i$ of modulation symbols (complex-valued symbols) from the sequence $g_i$. In 916, the base station apparatus 3 maps the modulation symbols $h_i$ to resource elements corresponding to PDCCH candidates.

The terminal apparatus 1 assumes processing from 900 to 914 and monitors the PDCCH. For example, the terminal apparatus 1 may assume that the matrix u' has been generated based on the aggregation level of the PDCCH used for the transmission of the downlink control information $a_i$, and monitor the PDCCH.

Hereinafter, various aspects of the terminal apparatus 1 and the base station apparatus 3 according to the present embodiment will be described.

(1) A first aspect of the present embodiment is a terminal apparatus 1 including: a receiver configured to receive a PDCCH including downlink control information; and a decoding unit configured to decode downlink control information, wherein a sequence of coded bits of the downlink control information is scrambled with a scrambling sequence, and the scrambling sequence is initialized based at least on an aggregation level of the PDCCH.

(2) A second aspect of the present embodiment is a base station apparatus 3 including: a coding unit configured to encode downlink control information; and a transmitter configured to transmit a PDCCH including downlink control information, wherein a sequence of coded bits of the downlink control information is scrambled with a scrambling sequence, and the scrambling sequence is initialized based at least on an aggregation level of the PDCCH.

(3) In the first and second aspects of the present embodiment, the sequence of the coded bits of the downlink control information is generated based on a matrix u', and each of a part of elements $u_n$ in the matrix u' is set based on at least the aggregation level of the PDCCH.

According to the above, the terminal apparatus 1 and the base station apparatus 3 are capable of efficiently perform the downlink transmission and/or reception.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these apparatuses is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an. eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit 13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus, comprising:
a monitor unit configured to monitor a first physical downlink control channel (PDCCH) candidate with aggregation level 8 and a second PDCCH candidate with aggregation level 16 in a control resource set (CORESET) mapped to one orthogonal frequency division multiplexing (OFDM) symbol; and
a receiver configured to receive a physical downlink shared channel (PDSCH), which is scheduled by a PDCCH detected in the first PDCCH candidate, by assuming that a symbol of the PDSCH is mapped to a resource element that is not overlapping the second PDCCH candidate, wherein:
the PDSCH overlaps the second PDCCH candidate in frequency domain,
a smallest index of a first plurality of control channel elements (CCEs) that constitute the first PDCCH candidate is identical to a smallest index of a second plurality of CCEs that constitute the second PDCCH candidate, and
each of a third plurality of CCEs constituting the CORESET includes six contiguous Resource Element Groups (REGs) in the frequency domain.

2. A communication method used for a terminal apparatus, the communication method comprising:
monitoring a first physical downlink control channel (PDCCH) candidate with aggregation level 8 and a second PDCCH candidate with aggregation level 16 in a control resource set (CORESET) mapped to one orthogonal frequency division multiplexing (OFDM) symbol; and
receiving a physical downlink shared channel (PDSCH), which is scheduled by a PDCCH detected in the first PDCCH candidate, by assuming that a symbol of the PDSCH is mapped to a resource element that is not overlapping the second PDCCH candidate, wherein:
the PDSCH overlaps the second PDCCH candidate in frequency domain,
a smallest index of a first plurality of control channel elements (CCEs) that constitute the first PDCCH candidate is identical to a smallest index of a second plurality of CCEs that constitute the second PDCCH candidate, and
each of a third plurality of CCEs constituting the CORESET includes six contiguous Resource Element Groups (REGs) in the frequency domain.

* * * * *